United States Patent
Lewis

(10) Patent No.: US 8,431,113 B2
(45) Date of Patent: *Apr. 30, 2013

(54) POLYMER CONJUGATES

(75) Inventor: Andrew Lennard Lewis, Surrey (GB)

(73) Assignee: Biocompatibles UK Limited, Farrnham (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/243,887

(22) Filed: Sep. 23, 2011

(65) Prior Publication Data

US 2012/0016085 A1 Jan. 19, 2012

Related U.S. Application Data

(62) Division of application No. 10/501,393, filed as application No. PCT/GB03/00131 on Jan. 16, 2003, now Pat. No. 8,048,408.

(30) Foreign Application Priority Data

Jan. 16, 2002 (EP) .................................. 02250289

(51) Int. Cl.
*A61K 31/00* (2006.01)
*C08F 8/00* (2006.01)
*C08F 259/00* (2006.01)

(52) U.S. Cl.
USPC ....................... 424/78.3; 525/132; 525/276

(58) Field of Classification Search .................. 525/132, 525/276; 424/78.3
See application file for complete search history.

(56) References Cited

U.S. PATENT DOCUMENTS

| | | | |
|---|---|---|---|
| 5,122,614 A | 6/1992 | Zalipsky | |
| 5,191,015 A | 3/1993 | Sheppard et al. | |
| 5,198,493 A | 3/1993 | Holmberg et al. | |
| 5,260,373 A | 11/1993 | Profy et al. | |
| 5,328,955 A | 7/1994 | Rhee et al. | |
| 5,444,150 A | 8/1995 | Inman et al. | |
| 5,658,561 A | 8/1997 | Nakabayashi et al. | |
| 5,855,987 A | 1/1999 | Margel et al. | |
| 5,888,990 A | 3/1999 | Chasalow | |
| 5,932,462 A | 8/1999 | Harris et al. | |
| 6,113,906 A | 9/2000 | Greenwald et al. | |
| 6,127,349 A | 10/2000 | Chasalow | |
| 6,251,382 B1 | 6/2001 | Greenwald et al. | |
| 6,310,149 B1 * | 10/2001 | Haddleton ...................... | 526/89 |
| 6,562,330 B1 | 5/2003 | Stratford et al. | |
| 6,803,438 B1 | 10/2004 | Brocchini et al. | |
| 6,828,029 B1 | 12/2004 | Lewis et al. | |
| 6,833,276 B2 | 12/2004 | Klaerner et al. | |
| 6,852,816 B2 * | 2/2005 | Lewis et al. ................... | 526/277 |
| 7,300,990 B2 | 11/2007 | Lewis et al. | |
| 7,365,127 B2 | 4/2008 | Wu et al. | |
| 7,820,753 B2 * | 10/2010 | Lewis et al. ................... | 524/556 |
| 8,053,520 B2 * | 11/2011 | Lewis et al. ................... | 525/54.1 |
| 2002/0141965 A1 | 10/2002 | Ahn et al. | |
| 2003/0158333 A1 | 8/2003 | Roberts et al. | |
| 2004/0029794 A1 | 2/2004 | Veronese et al. | |
| 2004/0030101 A1 | 2/2004 | Bailon et al. | |
| 2004/0091451 A1 | 5/2004 | Charreyre et al. | |
| 2004/0157276 A1 | 8/2004 | Sumida et al. | |
| 2004/0162388 A1 | 8/2004 | Tjoeng | |
| 2004/0235734 A1 | 11/2004 | Bossard et al. | |
| 2005/0112203 A1 | 5/2005 | Shau et al. | |
| 2005/0163743 A1 | 7/2005 | Lewis | |
| 2005/2208801 | 10/2005 | Lewis | |
| 2006/0069203 A1 | 3/2006 | Lewis | |
| 2006/0135714 A1 | 6/2006 | Lewis | |
| 2007/0123646 A1 | 5/2007 | Lele et al. | |
| 2007/0276088 A1 | 11/2007 | Maynard et al. | |
| 2008/0206182 A1 | 8/2008 | Sommermeyer et al. | |

FOREIGN PATENT DOCUMENTS

| | | | |
|---|---|---|---|
| WO | 93/01221 A | | 1/1993 |
| WO | 9315775 A1 | | 8/1993 |
| WO | 96/30421 A | | 10/1996 |
| WO | 9843676 A1 | | 10/1998 |
| WO | 0127209 A1 | | 4/2001 |
| WO | WO 01/27209 | * | 4/2001 |
| WO | 0228929 A1 | | 4/2002 |
| WO | 02100439 A1 | | 12/2002 |
| WO | 03062290 A1 | | 7/2003 |
| WO | 03074026 A1 | | 9/2003 |
| WO | 03074090 A2 | | 9/2003 |

OTHER PUBLICATIONS

Chen et al, Controlled/'living' radical polymerization of MMA via in situ ATRP process, Chem. Commun., 2000, p. 233-234.
E.J. Ashford et al, "First example of the atom transfer radical polymerization of an acidic monomer: direct synthesis of methacrylic acid copolymers in aqueous media", Chem. Commun., XP-002276944, 1999, pp. 1285-1286.
Monfardini et al., "A Branched Monomethoxypoly(ethylene glycol) for Protein Modification," Bioconjugate Chemistry, 1995, vol. 6, No. 1, pp. 62-69.

* cited by examiner

*Primary Examiner* — Blessing Fubara
(74) *Attorney, Agent, or Firm* — Sughrue Mion, PLLC

(57) ABSTRACT

The present invention relates to conjugates of biologically active compounds, preferably therapeutically active compounds, with polymeric moieties having low polydispersity, as well as controlled polymerisation processes for producing the conjugates. An initiation for a controlled radical polymerisation process comprises a biologically active, usually therapeutically active, moiety and the monomer includes zwitterionic monomer for instance 2-methacryloyloxyethyl-2'-trimethylammonium ethyl phosphate inner salt. The process allows close control of the molecular weight and polydispersity of the polymeric moiety and the possibility of optimising the delivery characteristics of the active agent.

26 Claims, No Drawings

POLYMER CONJUGATES

CROSS REFERENCE TO RELATED APPLICATIONS

This application is a divisional of pending U.S. application Ser. No. 10/501,393, which is a National Stage of International Application No. PCT/GB03/00131 filed Jan. 16, 2003, claiming priority based on European Patent Application No. 02250289.2, filed Jan. 16, 2002, the contents of all of which are incorporated herein by reference in their entirety.

BACKGROUND OF THE INVENTION

1. Field of the Invention

The present invention relates to conjugates of biologically active compounds, preferably therapeutically active compounds, with polymeric moieties having low polydispersity, as well as controlled polymerisation processes for producing the conjugates.

2. Description of the Related Art

The field of polymer therapeutics involves provision of conjugates of therapeutically active compounds and polymers of various types. Selection of the class of polymer, and its properties, allows control of delivery of the therapeutic to a target within the body of the patient to be treated. Targeting may be active, by providing the conjugate with a specific label, capable of binding to complementary molecules in the target region, or passive, by controlling the molecular weight of the polymer. Conjugation of a therapeutically active compound to a polymer may control the solubility of the therapeutically active compound, its stability in the circulation, its rate of removal by the kidneys and/or liver, as well as its immunogenicity.

One example of a polymer therapeutic is the compound PK-1, a conjugate of doxorubicin with hydroxypropyl-methacrylamide copolymer. The drug is conjugated to side chains on the polymer by an oligopeptidyl linker.

In WO-A 01/18080, controlled radical polymerisation processes are used to form the polymers from monomers having reactive groups, which may, after polymerisation, be used to conjugate to therapeutic ligands. The low polydispersity polymers formed by the controlled radical polymerisation processes are said to have particular advantages for therapeutic use.

Non-polymeric groups may also be conjugated to biologically active molecules, for instance therapeutically active molecules, to increase their water solubility, as well as control their stability in serum/circulation, especially for controlling drug delivery for orally administered compounds. In WO-A 98/43676, U.S. Pat. Nos. 5,888,990 and 6,127,349, a variety of therapeutically active compounds, including compounds which are water-insoluble, are conjugated to zwitterionic groups, to control their solubility or stability in serum. The zwitterionic groups may be phosphocholine groups. The synthetic method for conjugating the phosphocholine groups generally involves reaction of an alcohol with 2-chloro-2-oxo-1,3,2-dioxaphospholane, followed by a ring opening amination with trimethylamine. Other reactions involve conjugation of an alcohol having a PC group, with the carboxylic group of a therapeutically active using a carbodiimide to form an ester conjugate.

In our earlier publication WO-A 93/15775, ethylenically unsaturated monomers including zwitterionic groups, for instance 2-methacryloyloxy-2'-ethyltrimethylammonium-phosphate inner salt (MPC), are polymerised by a graft polymerisation process onto carbohydrate substrates. The substrate may be soluble, for instance a water soluble cellulose derivative. Polymerisation involves generation of a free radical at a hydroxyl group on the substrate by contact with cerium IV ions. The zwitterionic treated compounds were then used at surfaces of membranes to improve haemocompatibility.

In our earlier application, not published at the priority date hereof, PCT/GB01/04432, atom transfer radical polymerisation is carried out using monomers including zwitterionic monomers, for instance MPC. The product polymers may be used as matrices for drug delivery, for instance block copolymers may form micelles, useful as drug delivery vehicles. There is no suggestion that covalent conjugation of the drug molecule to the polymer should be considered.

Haddleton, in a paper presented at a meeting of the Society Chemical Industry London 1999, describes atom transfer radical polymerisation using initiators comprising biologically active molecules including carbohydrates, especially ribose moieties of nucleosides or steroids. The monomers are ethylenically unsaturated monomers which may form water soluble products. The monomers may include polyethylene glycol moieties (polyethyleneglycol methacrylate), as well as cationic groups, such as acrylic ester compounds having amine substituents in the alkyl groups. Suitable initiators are formed by acylating an alcohol derivative of the biologically active molecule with a reactive acid compound having an a halogen substituent, preferably at a tertiary carbon atom.

DETAILED DESCRIPTION OF THE INVENTION

The present invention provides polymerisation process in which ethylenically unsaturated monomers including a zwitterionic monomer of the general formula I $$YBX \qquad \qquad I$$

in which Y is an ethylenically unsaturated group selected from $H_2C=CR—CO-A-$, $H_2C=CR—C_6H_4-A^1-$, $H_2C=CR—CH_2A^2$, $R^{20}—CO—CR=CR—CO—O$, $RCH=CH—CO—O—$, $RCH=C(COOR^2)CH_2—CO—O$,

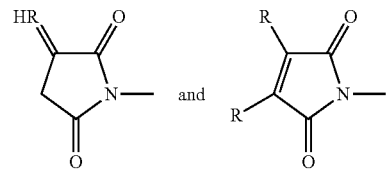

and

A is —O— or $NR^1$;
$A^1$ is selected from a bond, $(CH_2)_nA^2$ and $(CH_2)_nSO_3$— in which n is 1 to 12;
$A^2$ is selected from a bond, —O—, O—CO—, CO—O, CO—$NR^1$—, —$NR^1$—CO, O—CO—$NR^1$—, $NR^1$—CO—O—;
R is hydrogen or $C_{1-4}$ alkyl;
$R^1$ is hydrogen, $C_{1-4}$-alkyl or BX;
$R^2$ is hydrogen or $C_{1-4}$ alkyl;
B is a bond, or a straight branched alkanediyl, alkylene oxaalkylene, or alkylene (oligooxalkylene) group, optionally containing one or more fluorine substituents;
X is a zwitterionic group
are polymerised by a living radical polymerisation process in the presence of an initiator, and a catalyst;
in which the initiator comprises a biologically active moiety and a radical forming moiety.

The initiator may be any compound which has a suitable radical forming moiety, which may be a moiety from which a halogen atom is removed, or from which a radical group is removed, for instance NO-containing groups, to leave a radical at which polymerisation of the ethylenically unsaturated monomers may initiate and propagate. The radical forming moiety may comprise a halogen atom, preferably attached to a secondary or, more preferably, tertiary carbon atom, in turn joined to electron withdrawing groups such as carbonyl, sulphonyl, phosphoryl or aryl group. A halogen atom is preferably bromine but may alternatively be chlorine or iodine.

Preferably the radical initiator is of the general formula V $$R^{11}R^{12}R^{13}C-Y \quad\quad V$$

where:

Y is selected from the group consisting of Cl, Br, I, $OR^{10}$, $SR^{14}$, $SeR^{14}$, $OP(=O)R^{14}$, $OP(=O)(OR^{14})_2$, $O-N(R^{14})_2$ and $S-C(=S)N(R^{14})_2$, where $R^{10}$ is alkyl of from 1 to 20 carbon atoms in which each of the hydrogen atoms may be independently replaced by halide, $R^{14}$ is aryl or a straight or branched $C_1$-$C_{20}$ alkyl group, and where an $N(R^{14})_2$ group is present, the two $R^{14}$ groups may be joined to form a 5- or 6-membered heterocyclic ring;

$R^{11}$ and $R^{12}$ are each independently selected from the group consisting of H, halogen, $C_1$-$C_{20}$ alkyl, $C_3$-$C_8$ cycloalkyl, $C(=O)R^{15}$, $C(=O)NR^{16}R^{17}$, COCl, OH, CN, $C_2$-$C_{20}$ alkenyl, oxiranyl, glycidyl, aryl, heterocyclyl, aralkyl and aralkenyl, in any of which the alkyl, alkenyl or aryl, heterocyclyl or cycloalkyl groups there may be from 1 to 3 substituents selected from the group consisting of hydrogen, hydroxy $C_1$-$C_4$ alkoxy, acyloxy, aryl, heterocyclyl, $C(=O)R^{15}$, $C(=O)NR^{16}R^{17}$, $-CR^{12}R^{13}Y$, $CR^{11}R^{12}Y$, oxiranyl and glycidyl;

where $R^{15}$ is alkyl of from 1 to 20 carbon atoms, alkoxy of from 1 to 20 carbon atoms, oligo(alkoxy) in which each alkoxy group has 1 to 3 carbon atoms, aryloxy or heterocyclyloxy any of which groups may have substituents selected from optionally substituted alkoxy, oligoalkoxy, amino (including mono- and di-alkyl amino and trialkyl ammonium, which alkyl groups, in turn may have substituents selected from acyl, acyloxy, alkoxy, alkoxycarbonyl, alkenoxycarbonyl, aryl and hydroxy), and hydroxyl groups;

$R^{16}$ and $R^{17}$ are independently H or alkyl of from 1 to 20 carbon atoms which alkyl groups, in turn may have substituents selected from alkoxy, acyl, acyloxy, alkoxycarbonyl, alkenoxycarbonyl, aryl and hydroxy, or $R^{16}$ and $R^{17}$ may be joined together to form an alkanediyl group of from 2 to 5 carbon atoms, thus forming a 3- to 6-membered ring; and $R^{13}$ is selected from the group consisting of biologically active group-substituted alkyl, cycloalkyl, $-COR^{15}$, $-CONR^{16}R^{17}$, alkenyl, aryl, heterocyclyl, aralkyl and aralkenyl groups, in any of which the alkyl, alkenyl or aryl, heterocyclyl or cycloalkyl groups there may be from 1 to 3 substituents selected from the group consisting of hydrogen, hydroxy $C_1$-$C_4$ alkoxy, acyloxy, aryl, heterocyclyl, $C(=O)R^{15}$, $C(=O)NR^{16}R^{17}$, $-CR^{12}R^{13}Y$, $CR^{11}R^{12}Y$, oxiranyl and glycidyl where $R^{15}$, $R^{16}$ and $R^{17}$ are groups as defined above for $R^{11}$ and $R^{12}$ with the biologically active group substituted on an alkyl cycloalkyl, alkenyl aryl or heterocyclyl group.

At least one of the groups $R^{11}$, $R^{12}$ and $R^{13}$ should be electron withdrawing, to stabilise the radical formed upon removal of Y. Suitable electron-withdrawing groups are mentioned above. Preferably one of $R^{11}$, $R^{12}$ and $R^{13}$, usually $R^{13}$, comprises the electron-withdrawing group. More preferably $R^{13}$ is an aryl group or is a group $COR^{15}$ in which $R^{15}$ is alkoxy. Preferably one of $R^{11}$ and $R^{12}$ is H and the other is methyl.

Since any of $R^{11}$, $R^{12}$ and $R^{13}$ may comprise a substituent $CR^{12}R^{13}$ or $CR^{11}R^{12}Y$, the initiator may be di-, oligo- or poly-functional. Preferably it is a mono-functional initiator.

The biologically active moiety is preferably a pharmacologically or diagnostically active moiety, i.e. the pharmacological or diagnostic activity may be evident in the polymerised product or after cleavage of the or part of the polymeric component of the product in vivo, after administration. It may be derived from an alcohol, amine, carboxylic acid or other functional (derivatisable) compound which is biologically active (the base compound).

Most preferably the initiator is a compound of general formula VI

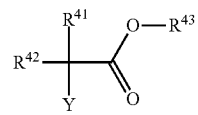

VI where $R^{41}$ and $R^{42}$ are independently selected from hydrogen, straight, branched and cyclic alkyl, aryl, aralkyl, hydroxyalkyl and acyloxyalkyl.

$R^{43}$ is a biologically active moiety;

Y is a radical forming group or a halogen atom.

Preferably $R^{41}$ and $R^{42}$ are not both hydrogen, more preferably each is methyl, or one is hydrogen and one is methyl.

$R^{43}$ is preferably derived from a pharmaceutically or diagnostically active alcohol $R^{43}OH$, for instance in which $R^{43}OH$ is a carbohydrate such as a sugar.

Another example of a group $R^{43}$ is a group $R^{44}AL$- derived from $R^{44}ALOH$ in which groups $R^{44}$ is derived from a pharmaceutically or diagnostically active compound $R^{44}AH$ where A is a divalent moiety selected from the group consisting of O, $NR^{45}$ ($R^{45}$ is H or lower alkyl), COO and $CONR^{45}$, and L is a divalent linker. L may be an oligopeptide based linker.

Preferably X is an ammonium, phosphonium, or sulphonium phosphate or phosphonate ester zwitterionic group, more preferably a group of the general formula II

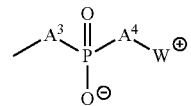

II in which the moieties $A^3$ and $A^4$, which are the same or different, are $-O-$, $-S-$, $-NH-$ or a valence bond, preferably $-O-$, and $W^+$ is a group comprising an ammonium, phosphonium or sulphonium cationic group and a group linking the anionic and cationic moieties which is preferably a $C_{1-12}$-alkanediyl group preferably in which $W^+$ is a group of formula $-W^1-N^+R^3_3$, $-W^1-P^+R^4_3$, $-W^1-S^+R^4_2$ or $-W^1-Het^+$ in which:

$W^1$ is alkanediyl of 1 or more, preferably 2-6 carbon atoms optionally containing one or more ethylenically unsaturated double or triple bonds, disubstituted-aryl (arylene), alkylene arylene, arylene alkylene, or alkylene aryl alkylene, cycloalkanediyl, alkylene cycloalkyl, cycloalkyl alkylene or alkylene cycloalkyl alkylene, which group $W^1$ optionally contains one or more fluorine substituents and/or one or more functional groups; and either the groups $R^3$ are the same or different and each is hydrogen or alkyl of 1 to 4 carbon atoms, preferably methyl, or aryl, such as phenyl, or two of the groups $R^3$ together with the nitrogen atom to which they are attached form an aliphatic heterocyclic ring containing from 5 to 7 atoms, or the three groups $R^3$ together with the nitrogen atom to which they are attached form a fused ring structure containing from 5 to 7 atoms in each ring, and optionally one or more of the groups $R^3$ is substituted by a hydrophilic functional group; and the groups $R^4$ are the same or different and each is $R^3$ or a group $OR^3$, where $R^3$ is as defined above; or Het is an aromatic nitrogen-, phosphorus- or sulphur-, preferably nitrogen-, containing ring, for example pyridine.

Monomers in which X is of the general formula in which $W^+$ is $W^1N^{\oplus}R^3{}_3$ may be made as described in our earlier specification WO-A 93/01221. Phosphonium and sulphonium analogues are described in WO-A 95/20407 and WO-A 94/16749.

Generally a group of the formula II has the preferred general formula III

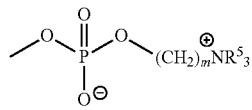

III where the groups $R^5$ are the same or different and each is hydrogen or $C_{1-4}$ alkyl, and m is from 1 to 4, in which preferably the groups $R^5$ are the same preferably methyl.

In phosphobetaine based groups, X may have the general formula IV

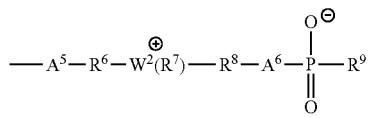

IV in which $A^5$ is a valence bond, —O—, —S— or —NH—, preferably —O—;

$R^6$ is a valence bond (together with $A^5$) or alkanediyl, —C(O)alkylene- or —C(O)NH alkylene preferably alkanediyl, and preferably containing from 1 to 6 carbon atoms in the alkanediyl chain;

$W^2$ is S, $PR^7$ or $NR^7$;

the or each group $R^7$ is hydrogen or alkyl of 1 to 4 carbon atoms or the two groups $R^7$ together with the heteroatom to which they are attached form a heterocyclic ring of 5 to 7 atoms;

$R^8$ is alkanediyl of 1 to 20, preferably 1 to 10, more preferably 1 to 6 carbon atoms;

$A^6$ is a bond, NH, S or O, preferably O; and $R^9$ is a hydroxyl, $C_{1-12}$ alkyl, $C_{1-12}$ alkoxy, $C_{7-18}$ aralkyl, $C_{7-18}$-aralkoxy, $C_{6-18}$ aryl or $C_{6-18}$ aryloxy group.

Monomers comprising a group of the general formula IV may be made by methods as described in JP-B-03-031718, in which an amino substituted monomer is reacted with a phospholane.

In compounds comprising a group of the general formula IV, it is preferred that $A^5$ is a bond;
$R^6$ is a $C_{2-6}$ alkanediyl;
$W^2$ is $NR^7$;
each $R^7$ is $C_{1-4}$ alkyl;
$R^8$ is $C_{2-6}$ alkanediyl;
$A^6$ is O; and
$R^9$ is $C_{1-4}$ alkoxy.

Alternatively X may be a zwitterion in which the anion comprises a sulphate, sulphonate or carboxylate group.

One example of such a group is a sulphobetaine group, of the general formula XI

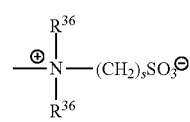

XI where the groups $R^{36}$ are the same or different and each is hydrogen or $C_{1-4}$ alkyl and s is from 2 to 4.

Preferably the groups $R^{36}$ are the same. It is also preferable that at least one of the groups $R^{36}$ is methyl, and more preferable that the groups $R^{36}$ are both methyl.

Preferably s is 2 or 3, more preferably 3.

Another example of a zwitterionic group having a carboxylate group is an amino acid moiety in which the alpha carbon atom (to which an amine group and the carboxylic acid group are attached) is joined through a linker group to the backbone of the biocompatible polymer. Such groups may be represented by the general formula XII

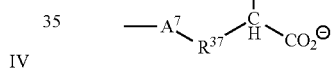

XII in which $A^7$ is a valence bond, —O—, —S— or —NH—, preferably —O—, $R^{37}$ is a valence bond (optionally together with $A^7$) or alkanediyl, —C(O)alkylene- or —C(O)NHalkylene, preferably alkanediyl and preferably containing from 1 to 6 carbon atoms; and the groups $R^{38}$ are the same or different and each is hydrogen or alkyl of 1 to 4 carbon atoms, preferably methyl, or two or three of the groups $R^{38}$, together with the nitrogen to which they are attached, form a heterocyclic ring of from 5 to 7 atoms, or the three group $R^{38}$ together with the nitrogen atom to which they are attached form a fused ring heterocyclic structure containing from 5 to 7 atoms in each ring.

Another example of a zwitterion having a carboxylate group is a carboxy betaine —$N^{\oplus}(R^{39})_2(CH_2)_rCOO$— in which the $R^{39}$ groups are the same or different and each is hydrogen or $R_{1-4}$ alkyl and r is 2 to 6, preferably 2 or 3.

In the zwitterionic monomer of the general formula I it is preferred that the ethylenic unsaturated group Y is $H_2C=CR$—CO-A-. Such acrylic moieties are preferably methacrylic, that is in which R is methyl, or acrylic, in which R is hydrogen. Whilst the compounds may be (meth)acrylamido compounds (in which A is $NR^1$), in which case $R^1$ is preferably hydrogen, or less preferably, methyl, most preferably the compounds are esters, that is in which A is O.

In monomers of the general formula I, especially where Y is the preferred (alk)acrylic group, B is most preferably an alkanediyl group. Whilst some of the hydrogen atoms of such group may be substituted by fluorine atoms, preferably B is an unsubstituted alkanediyl group, most preferably a straight chain group having 2 to 6 carbon atoms.

A particularly preferred zwitterionic monomer is 2-methacryloyloxyethyl-2'-trimethylammonium ethyl phosphate inner salt.

In the polymerisation process, the ethylenically unsaturated monomers may further include a comonomer. Comonomers are copolymerisable with the zwitterionic monomer and are preferably selected from anionic, cationic and nonionic monomers. It is generally preferred that the monomer mixture include at least one nonionic monomer. Another class of comonomer is a cross-linking monomer having a functional group which may be cured after polymerisation to cross-link the polymer.

Examples of suitable comonomers are compounds of the general formula X

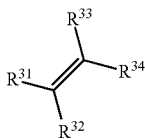

X in which $R^{31}$ is selected from hydrogen, halogen, $C_{1-4}$ alkyl and groups $COOR^2$ in which $R^2$ is hydrogen and $C_{1-4}$ alkyl;

$R^{32}$ is selected from hydrogen, halogen and $C_{1-4}$ alkyl;

$R^{33}$ is selected from hydrogen, halogen, $C_{1-4}$ alkyl and groups $COOR^2$ provided that $R^{31}$ and $R^{33}$ are not both $COOR^2$; and $R^{34}$ is a $C_{1-10}$ alkyl, a $C_{1-20}$ alkoxycarbonyl, a mono- or di-($C_{1-20}$ alkyl)amino carbonyl, a $C_{6-20}$ aryl (including alkaryl) a $C_{7-20}$ aralkyl, a $C_{6-20}$ aryloxycarbonyl, a $C_{1-20}$-aralkyloxycarbonyl, a $C_{6-20}$ arylamino carbonyl, a $C_{7-20}$ aralkyl-amino, a hydroxyl or a $C_{2-10}$ acyloxy group, any of which may have one or more substituents selected from halogen atoms, alkoxy, oligo-alkoxy, aryloxy, acyloxy, acylamino, amine (including mono and di-alkyl amino and tri-alkylammonium in which the alkyl groups may be substituted), carboxyl, sulphonyl, phosphoryl, phosphino, (including mono- and di-alkyl phosphine and tri-alkylphosphonium), zwitterionic, hydroxyl groups, vinyloxycarbonyl and other vinylic or allylic substituents, and reactive silyl or silyloxy groups, such as trialkoxysilyl groups;

or $R^{34}$ and $R^{33}$ or $R^{34}$ and $R^{32}$ may together form —$CONR^{35}CO$ in which $R^{35}$ is a $C_{1-20}$ alkyl group.

It is preferred for at least two of the groups $R^{31}R^{32}R^{33}$ and $R^{34}$ to be halogen or, more preferably, hydrogen atoms. Preferably $R^{31}$ and $R^{32}$ are both hydrogen atoms. It is particularly preferred that compound of general formula X be a styrene-based or acrylic based compound. In styrene based compounds $R^{34}$ represents an aryl group, especially a substituted aryl group in which the substituent is an amino alkyl group, a carboxylate or a sulphonate group. Where the comonomer is an acrylic type compound, $R^{34}$ is an alkoxycarbonyl, an alkyl amino carbonyl, or an aryloxy carbonyl group. Most preferably in such compounds $R^{34}$ is a $C_{1-20}$-alkoxy carbonyl group, optionally having a hydroxy substituent. Acrylic compounds are generally methacrylic in which case $R^{33}$ is methyl.

Where a comonomer is included in the polymerisation process of the invention, the molar ratio of zwitterionic monomer to comonomer is preferably in the range 1:50 to 50:1, more preferably in the range 1:10 to 10:1, more preferably in the range 1:5 to 1:1.

In the atom or group radical transfer polymerisation process the transition metal compound which comprises a component of the catalyst is $M_t^{n+}X'_n$, where:

$M_t^{n+}$ may be selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{2+}$, $Mn^{3+}$, $Mn^{4+}$, $Rh^{3+}$, $Rh^{4+}$, $Re^{2+}$, $Re^{3+}$, $Co^+$, $Co^{2+}$, $Co^{3+}$, $V^{2+}$, $V^{3+}$, $Zn^+$, $Zn^{2+}$, $Ni^{2+}$, $Ni^{3+}$, $Au^+$, $Au^{2+}$, $Ag^+$ and $Ag^{2+}$;

X' is selected from the group consisting of halogen, $C_1$-$C_6$-alkoxy, $(SO_4)_{1/2}$, $(PO_4)_{1/3}$, $(R^{18}PO_4)\frac{1}{2}$, $(R^{18}_2PO_4)$, triflate, hexafluorophosphate, methanesulphonate, arylsulphonate, CN and $R^{19}CO_2$, where $R^{18}$ is aryl or a straight or branched $C_{1-20}$ alkyl and $R^{19}$ is H or a straight or branched $C_1$-$C_6$ alkyl group which may be substituted from 1 to 5 times with a halogen; and n is the formal charge on the metal ($0 \leq n \leq 7$).

Preferably X' is halide, most preferably chloride or bromide. Particularly suitable transition metal compounds are based on copper or ruthenium, for instance $CuCl$ or $RuCl_2$.

In the catalyst, the ligand is preferably selected from the group consisting of:

a) compounds of the formulas:

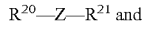

$R^{20}$—Z—$R^{21}$ and

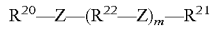

$R^{20}$—Z—$(R^{22}$—Z$)_m$—$R^{21}$ where:

$R^{20}$ and $R^{21}$ are independently selected from the group consisting of H, $C_1$-$C_{20}$ alkyl, aryl, heterocyclyl and $C_1$-$C_6$ alkoxy, $C_1$-$C_4$ dialkylamino, C(=O)$R^{22}$, C(=O)$R^{23}R^{24}$ and $A^7C$(=O)$R^{25}$, where $A^7$ may be $NR^{26}$ or O; $R^{22}$ is alkyl of from 1 to 20 carbon atoms, aryloxy or heterocyclyloxy; $R^{23}$ and $R^{24}$ are independently H or alkyl of from 1 to 20 carbon atoms or $R^{23}$ and $R^{24}$ may be joined together to form an alkanediyl group of from 2 to 5 carbon atoms, thus forming a 3- to 6-membered ring; $R^{25}$ is H, straight or branched $C_1$-$C_{20}$ alkyl or aryl and $R^{26}$ is hydrogen, straight or branched; $C_{1-20}$-alkyl or aryl; or $R^{20}$ and $R^{21}$ may be joined to form, together with Z, a saturated or unsaturated ring;

Z is O, S, $NR^{27}$ or $PR^{27}$, where $R^{27}$ is selected from the same group as $R^{20}$ and $R^{21}$, and where Z is $PR^{27}$, $R^{27}$ can also $C_1$-$C_{20}$ alkoxy or Z may be a bond, $CH_2$ or a fused ring, where one or both of $R^{20}$ and $R^{21}$ is heterocyclyl, each $R^{22}$ is independently a divalent group selected from the group consisting of $C_1$-$C_8$ cycloalkanediyl, $C_1$-$C_8$ cycloalkanediyl, arenediyl and heterocyclylene where the covalent bonds to each Z are at vicinal positions or $R^{22}$ may be joined to one or both of $R^{20}$ and $R^{21}$ to formulate a heterocyclic ring system; and m is from 1 to 6;

b) CO;

c) porphyrins and porphycenes, which may be substituted with from 1 to 6 halogen atoms, $C_{1-6}$ alkyl groups, $C_{1-6}$-alkoxy groups, $C_{1-6}$ alkoxycarbonyl, aryl groups, heterocyclyl groups, and $C_{1-6}$ alkyl groups further substituted with from 1 to 3 halogens;

d) compounds of the formula $R^{23}R^{24}C(C(=O)R^{25})_2$, where $R^{25}$ is $C_{1-20}$ alkyl, $C_{1-20}$ alkoxy, aryloxy or heterocyclyloxy; and each of $R^{23}$ and $R^{24}$ is independently selected from the group consisting of H, halogen, $C_{1-20}$ alkyl, aryl and heterocyclyl, and $R^{23}$ and $R^{24}$ may be joined to form a $C_{1-8}$ cycloalkyl ring or a hydrogenated aromatic or heterocyclic ring, of which the ring atoms may be further substituted with 1 to 5 $C_{1-6}$ alkyl groups, $C_{1-6}$ alkoxy groups, halogen atoms, aryl groups, or combinations thereof; and e) arenes and cyclopentadienyl ligands, where said cyclopentadienyl ligand may be substituted with from one to five methyl groups, or may be linked through and ethylene or propylene chain to a second cyclopentadienyl ligand.

Selection of a suitable ligand is, for instance, based upon the solubility characteristics and/or the separability of the catalyst from the product polymer mixture. Generally it is catalyst to be soluble in a liquid reaction mixture, although under some circumstances it may be possible to immobilise the catalyst, for instance an a porous substrate. For the preferred process, which is carried out in the liquid phase, the ligand is soluble in a liquid phase. The ligand is generally a nitrogen containing ligand. The preferred ligand may be a compound including a pyridyl group and an imino moiety, such as bipyridine, or

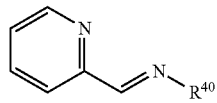

VII where $R^{40}$ is a suitable alkyl group, the substituent being variable and adaptable to confer desired solubility characteristics or may be triphenylphosphine or 1,1,4,7,10,10-hexamethyl-triethylene tetramine.

Such nitrogen-containing ligands are usefully used in combination with copper (I) chloride, copper (I) bromide or ruthenium chloride transition metal compounds as part of the catalyst.

The living radical polymerisation process of the invention is preferably carried out to achieve a degree of polymerisation in the range 2 to 100. Preferably the degree of polymerisation is in the range 5 to 50, more preferably in the range 10 to 25. In the preferred group or atom transfer radical polymerisation technique, the degree of polymerisation is directly related to the initial ratios of initiator to monomer. Preferably the ratio is in the range 1:(2 to 100), more preferably in the range of 1:(5 to 50), most preferably in the range 1:(10 to 25).

The ratio of metal compound and ligand in the catalyst should be approximately stoichiometric, based on the ratios of the components when the metal ion is fully complexed. The ratio should preferably be in the range 1:(0.5 to 2) more preferably in the range 1:(0.8:1.25). Preferably the range is about 1:1.

In the process, the catalyst may be used in amounts such that a molar equivalent quantity as compared to the level of initiator is present. However, since catalyst is not consumed in the reaction, it is generally not essential to include levels of catalyst as high as of initiator. The ratio of catalyst (based on transition metal compound) to initiator is preferably in the range 1:(1 to 50), more preferably in the range 1:(1 to 10).

Whilst the polymerisation reaction may be carried out in the gaseous phase, it is more preferably carried out in the liquid phase. The reaction may be heterogeneous, that is comprising a solid and a liquid phase, but is more preferably homogeneous. Preferably the polymerisation is carried out in a single liquid phase. Where the monomer is liquid, it is sometimes unnecessary to include a non-polymerisable solvent. More often, however, the polymerisation takes place in the presence of a non-polymerisable solvent. The solvent should be selected having regard to the nature of the zwitterionic monomer and any comonomer, for instance for its suitability for providing a common solution containing both monomers. The solvent may comprise a single compound or a mixture of compounds.

Where the zwitterionic monomer is MPC, may be desirable to include water in the polymerisation mixture. Preferably water should be present in an amount in the range 10 to 100% by weight based on the weight of ethylenically unsaturated monomer. Preferably the total non-polymerisable solvent comprised 1 to 500% by weight based on the weight of ethylenically unsaturated monomer. It has been found that the zwitterionic monomer and water should be in contact with each other for as short a period as possible prior to contact with the initiator and catalyst. It may be desirable therefore for all the components of the polymerisation other than the zwitterionic monomer to be premixed and for the zwitterionic monomer to be added to the premix as the last additive.

It is often desired to copolymerise MPC or other zwitterionic monomer with a comonomer and/or an initiator which is insoluble in water. In such circumstances, a solvent or co-solvent (in conjunction with water) is included to confer solubility on both MPC and the more hydrophobic monomer. Suitable organic solvents are ethers, esters and, most preferably, alcohols. Especially where a mixture of organic solvent and water is to used, suitable alcohols are $C_{1-4}$-alkanols. Methanol is expected to be particularly suitable in the polymerisation process of the invention. Ethanol and isopropanol are likely to be useful also.

The process may be carried out at raised temperature, for instance up to 60 to 80° C. The process may proceed sufficiently fast at ambient temperature.

The polymerisation process of the invention should preferably be carried out so as to provide polymers of zwitterionic monomers having a polydispersity (of molecular weight) of less than 1.5, as judged by gel permeation chromatography. Polydispersities in the range 1.2 to 1.4 are preferred. Conversion rates achieved in the process should be as high as possible, for instance over 90% often over 95% or higher. It is preferred that the process be continued until a conversion level of at least 50%, or usually, at least 70% is reached.

According to a further aspect of the invention there is provided a novel compound comprising a conjugate of a biologically active moiety and a polymer group having a general formula VIII:

VIII in which $M^1$ is the divalent group formed when the compound of the general formula I is polymerised, $M^2$ is the divalent group formed when a comonomer as defined in claim 18 is polymerised, and $I^1$ is the residue of the initiator defined in claim 1 which comprises said biologically active moiety, and $R^{36}$ is a monofunctional group or atom which terminates the polymeric group -$M^1{}_n M^2{}_m$-, n is at least 2 and m is at least 0.

Preferably the degree of polymerisation of monomers forming residues $M^1$ is at least 5, more preferably at least 10, that is n is at least 5, preferably at least 10. The value of n is generally no more than 100, preferably less than 50.

Groups $M^2$ are derived from comonomer, for instance of the general formula X defined above. The groups $M^2$ thus have the general formula IX

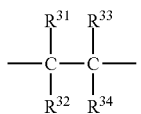

IX

Where a comonomer is not included, n is 0. In the general formula defining the polymer, the groups $M^1$ and $M^2$ are randomly arranged. The ratio n:m represents the molar ratio of zwitterionic monomer to comonomer used in the polymerisation.

$R^{36}$ may include a further polymeric block, for instance, formed in a second controlled radical polymerisation step involving a further ethylenically unsaturated monomer, for instance which may have the general formula X above.

The selection of suitable monomer or monomer mixtures to form such a second block may allow an amphiphilic polymer to be formed, i.e. if the second block is hydrophobic relative to the block

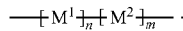

The present invention also covers reverse block copolymers to the type described above, that is where a first block is formed by polymerisation of monomers not including a monomer of the formula I, in the presence of the specified initiator, and a second block is formed in a second controlled radical polymerisation of monomer including zwitterionic monomer in the presence of the product of the first polymerisation step.

The degree of polymerisation and the polydispersity of the polymeric group of the conjugate of the invention produced by the polymerisation process of the first aspect of the invention, allows for control of the solubility of the biologically active compound. Where the compound is therapeutically active, for instance, control of the nature of the polymeric group may allow for good control of delivery of the therapeutic to a target, organ, tumour or cell. The molecular weight should be high enough to minimise removal of the conjugate by the kidneys, but should be below the threshold which renders a compound hepatoselective. For instance the weight should be selected so as to take advantage of the phenomenon of enhanced permeability and retention (EPR) observed in solid tumours where the active is an anti-tumour agent for local delivery to the tumour. It may be desirable to provide the conjugate with an active targeting moiety, for instance by derivatising terminal groups $R^{36}$ with a binding moiety, for instance an antigen, antibody, oligopeptide, oligonucleotide, lectin, biotin, or other member of a specific binding pair, capable of binding to another number of the binding pair localised at the target organ. The biologically active compound may be a protein or polypeptide, a carbohydrate, a nucleic acid or another drug, or may comprise a combination of such components.

The polymeric group may further provide improved stability in the circulation or in serum, or improved circulation times, as has been described for the monomeric PC-ylation in WO-A-9843676 etc. The invention is believed to be of particular utility where the compound from which the biologically active compound is derived (e.g. $R^{44}AH$ or $R^{43}OH$) has limited water solubility, for instance solubility less than in the range 0.1 to 10 mg/ml. Preferably the water solubility of the conjugate compound is at least 10 molar times higher, preferably at least 100 times higher than the base compound.

The present invention also provides specific drug-polymer conjugates having increased solubility in water as compared to the base drug and intermediates useful for producing the polymer conjugates in an atom transfer radical polymerisation method. The intermediates are compounds of the general formula VI where the group $R^{43}$ is the residue of a phenolic compound $R^{43}OH$ selected from salicylic acid, acetaminophen and dexamethasone. Thus the intermediates are 2-bromo-2-alkyl-alkanoyl esters of salicylic acid, acetaminophen and dexamethasone.

The invention is illustrated in the following reaction schemes.

REFERENCE EXAMPLE 1

General Method of Producing Initiators

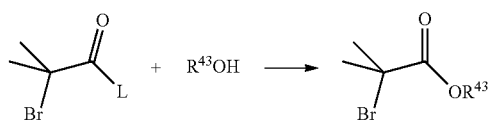

In the above reaction, L is a leaving group. This may be, for instance, a halogen atom, an acyloxy group (i.e. the acylation reagent is an anhydride), or a group $-ON=C(Me)_2$. Where the leaving group is the last mentioned compound the esterification reaction may be conducted in dioxane, at raised temperature, for instance 60° C.

The above general reaction is carried out with compounds in which $R^{43}OH$ is a suitably protected carbohydrate, that is one in which all the hydroxyl groups apart from the hydroxyl group desired to be derivatised, are protected with removable groups. Conventional protecting group chemistry is appropriate. The carbohydrate may be a ribose group of a nucleoside. Alternatively $R^{43}OH$ may be an oligosaccharide. In a carbohydrate $R^{43}OH$ or a sugar such as glucose or galactose all other hydroxyl groups are protected during the reaction, for instance by acetylation or by protection of gem. diols by isopropylidene groups. Alternatively $R^{43}OH$ may be cholesterol.

A specific initiator may be formed by the following reaction scheme:

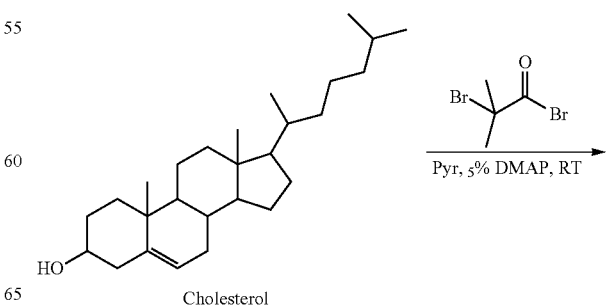

Cholesterol

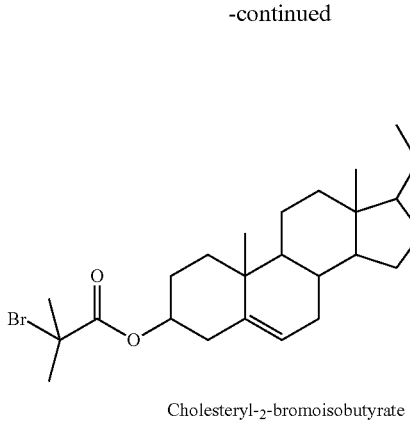

Cholesteryl-2-bromoisobutyrate

EXAMPLE 1

Cholesteryl-2-bromoisobutyrate is used as an initiator in an atom transfer radical polymerisation process using copper (1) bromide and a 2-pyridinecarbaldehyde imine ligand, as described in U.S. Pat. No. 6,310,149, using MPC monomer to form a polymer having a degree of polymerisation between 2 and 50, for instance in the range 5 to 20, using an appropriate molar ratio of initiator to monomer. The solvent is selected to provide common solubility of the initiator and the monomer, and to allow recovery of the polymer, for instance methanol.

An alternative polymerisation uses copper (I) bromide catalyst and bipyridine ligand. The solvent system in this case preferably includes water, or alcohol, preferably methanol, or a mixture of water and methanol.

The product may be analysed by gel permeation chromatography, to assess the number average and weight average molecular weight and the polydispersity.

EXAMPLE 2

Preparation of Salicylic Acid Bromo-modified Initiator

A 500 ml round bottom flask, resting in a water bath, with a stirrer bar was charged with 10 g of salicylic acid (Aldrich) and acetonitrile (Romil) was added in sufficient quantity to dissolve. 0.5 equivalent of N,N,N',N'-tetramethylethylenediamine (TMEDA, Aldrich) was added. A dropping funnel was charged with approximately 50 ml of acetonitrile and 1.25 equivalents of 2-bromoisobutyryl bromide (Aldrich). The contents of the flask were added dropwise over 2 hours. The reaction was left stirring over night and with a balloon fitted to equalise any pressure change. The amine halide salt precipitate was filtered off and the acetonitrile removed in vacuo. The product was dissolved into 200 ml of d.i. water and any excess 2-bromoisobutyryl bromide hydrolysed with sodium bicarbonate. The bromo-functionalised drug was extracted from the water using 150 ml of DCM, which was removed in vacuo to obtain the purified salicylic acid bromo-modified initiator as an off-white solid.

$^1$H NMR spectroscopy shows the aromatic protons at δ 8.05 ppm (doublet), δ 7.65 ppm (triplet), δ 7.4 ppm (triplet) and δ 7.15 ppm (doublet) respectively. There is a methyl peak at ca. δ 2 ppm from the methyls on the bromide group. There is no evidence of the OH proton which would be expected at δ 10 ppm. This is also supported by the $^{13}$C NMR, where carbon peaks are as follows; $\underline{C}$OOH-δ 167.5 ppm, Ar$\underline{C}$—COOH-δ 121 ppm, Ar$\underline{C}$-δ 135 ppm, Ar$\underline{C}$-δ 133 ppm, Ar$\overline{C}$-δ 137.5 ppm, Ar$\underline{C}$-δ 1$\overline{24}$ ppm, ArCOO$\overline{R}$-δ 152 ppm, 3 $\overline{C}$OOR δ 170 ppm, $\overline{C}$(CH$_3$)$_3$Br-δ 58 pp$\overline{m}$ and C(CH$_3$)$_3$Br at δ $\overline{31}$ ppm where R=$\overline{C}$(CH$_3$)$_3$Br

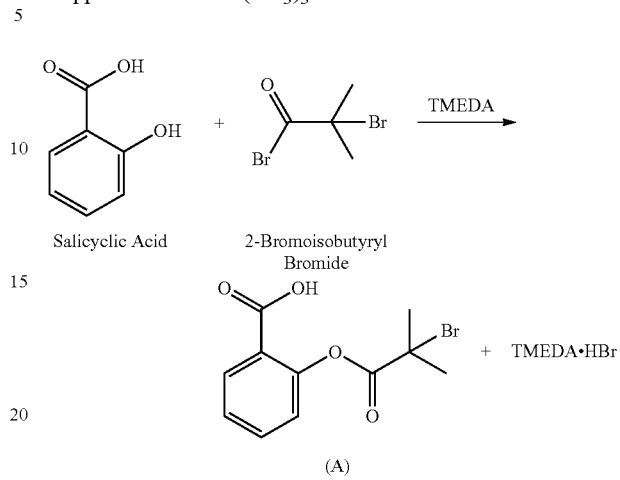

Salicyclic Acid     2-Bromoisobutyryl Bromide (A)

EXAMPLE 3

Preparation of 4-Acetamidophenol Bromo-modified Initiator

The reaction was carried out according to the procedure outlined in Example 2 but using 4-acetamidophenol as the drug to be modified. The product was isolated as an off-white solid.

$^1$H NMR spectroscopy shows aromatic protons at δ 7.6 ppm and δ 7.05 ppm. The methyl peak within the acetamido group appears at δ 1.98 ppm as expected and the proton on the amide group appears as a very small peak at ca. δ 9.8-9.9 ppm. As expected there is no evidence of the hydroxyl proton at δ 9.14 ppm, however there is now a methyl peak at ca. δ 2 ppm from the methyls on the bromide group. This is also supported by the $^{13}$C NMR, where the NH—$\underline{C}$=O can be found at δ 170 ppm, C—CO—C at δ 148 ppm, $\overline{C}$—CNH—C at δ 138 ppm, C—CNH$\overline{=}$C at δ 123 ppm and their has been a shift for the C—CO—C from δ 115 ppm to δ 122 ppm, NH—C=O—$\overline{C}$H$_3$ can be found at δ 24 ppm. Additionally there are new peaks at δ 31 ppm corresponding to the methyl groups on the bromide molecule. The carbonyl peak in the bromide group is also evident at δ 170 ppm and the methyl group, CH$_3$—CBr—CH$_3$ can be found at δ 58 ppm.

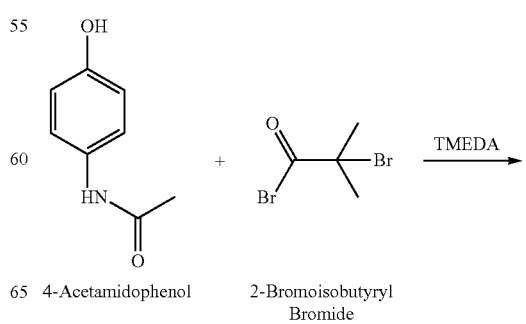

4-Acetamidophenol     2-Bromoisobutyryl Bromide

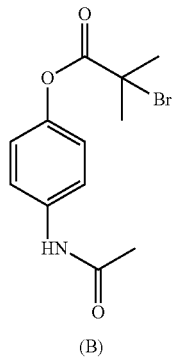

(B)

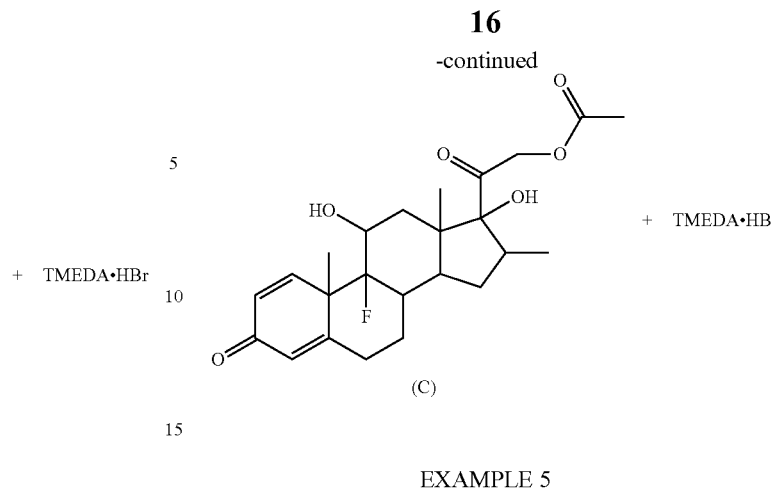

(C)

EXAMPLE 4

Preparation of Dexamethasone Bromo-modified Initiator

The reaction was carried out according to the procedure outlined in Example 2 but using dexamethasone as the drug to be modified. The product was isolated as a brown gum.

Proton NMR spectra (shown in FIG. 1) showed agreement with standard spectra for dexamethasone with a set of shifts owing to the attachment of the 2-bromoisobutyryl bromide at one of the OH sites. The protons (a) in the starting material have two peaks at δ 4.0 and δ 4.5 ppm, in FIG. 1 these two peaks have shifted to ca. δ 4.68 and ca. δ 5 ppm which would suggest that the initiator group has reacted at the hydroxyl on this methylene group. In the $^{13}C$ spectra there are also additional peaks not seen in the standard dexamethasone spectra at δ 31 ppm due to the methyl carbons; at δ 59 ppm due to the methyl carbon and at δ 68 due to the carbonyl carbon; all from the 2-bromoisobutyryl.

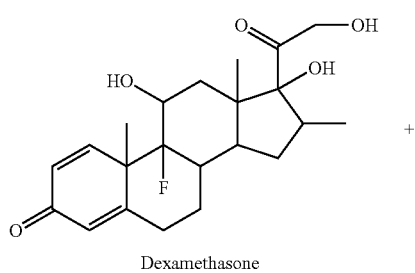

Dexamethasone

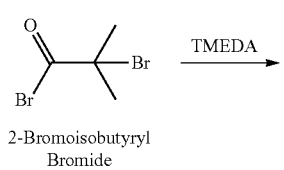

2-Bromoisobutyryl Bromide

EXAMPLE 5

Preparation of Poly(MPC)-modified Salicylic Acid

A stock solution of HPLC grade methanol was degassed and stored under $N_2$. A 100 ml 2-necked round bottom flask containing a stirrer bar was flushed with $N_2$ for 10 minutes, then sealed using 2 rubber septums. A dinitrogen atmosphere was maintained. All glass vials to be used for weighing material were also flushed with $N_2$ for 5 minutes before sealing until used.

TABLE 1

Reactant Amounts for Preparation of Poly(MPC)-modified Salicylic Acid

|  | MPC | Salicylic Acid-Br (A) | BPy | CuBr |
|---|---|---|---|---|
| Molar Ratio | 13 | 1 | 2 | 1 |
| No of mols | $2.29 \times 10^{-2}$ | $1.74 \times 10^{-3}$ | $4.59 \times 10^{-3}$ | $2.3 \times 10^{-3}$ |
| Calculated weight | 6.8 g | 0.5 | 0.2109 g | 0.097 g |

The salicylic acid bromo-modified initiator (A) (synthesised as in Example 2) was accurately weighed and transferred to the round bottom flask 10 ml of the stock methanol was added using a syringe. An excess of 2,2'-bipyridine (Bpy) was weighed into a second vial followed by the copper (I) bromide. The sealed vial was tapped gently against the side of the bench to mix the contents then added to the round bottom flask. An excess of MPC was rapidly weighed into a $3^{rd}$ vial, stirring in the round bottom flask was increased and the MPC added swiftly. Stirring was reduced to a gentle mixing and the reaction left to proceed for 1½-2 hours. The reaction was monitored by NMR by comparing integration of the MPC vinyl peaks at □5.6 and 6.1 ppm with the backbone methyl peak, which can be found at □1.0 ppm. A % conversion can be calculated from the integration value of the polymer peak as follows:

$$\% \text{ Conversion} = \frac{Z}{Z+5} \times 100$$

(where Z is the integration value of the polymer peak)

The resulting polymer was dissolved in methanol. A chromatography column fitted with a glass sinter was filled ½ to ¾ full with silica gel (grade 7754, 70-230 mesh, Aldrich Chemical Co.) and methanol passed down until all heat had dissipated from the column, any elution up to this point was discarded. The dissolved polymer was passed down the column to remove the (blue) copper and the dissolved polymer solution collected in a 500 ml round bottom flask. The solvent was removed in vacuo and the polymer dried by freeze-drying to yield greater than 50% of a white fluffy crystalline solid.

Upon polymerisation the salicylic acid is identifiable in the $^1$H NMR spectrum as a series of peaks between δ 6.9 and 8.8 ppm, alongside the expected poly(MPC) peaks, and also confirms the correct monomer:initator ratio. Aqueous GPC showed the polydispersity to be 1.14.

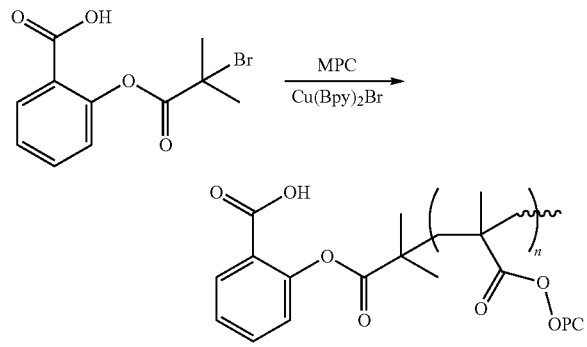

In the reaction scheme "OPC" is the abbreviation for

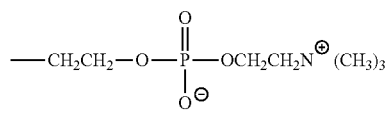

EXAMPLE 6

Preparation of Poly(MPC)-modified 4-Acetamidophenol

The method for the preparation of Poly(MPC)-modified 4-Acetamidophenol was exactly that as described in Example 5 using (B) (synthesised as in Example 3) as the initiator and the following quantities of reactants:

TABLE 2

Reactant Amounts for Preparation of Poly(MPC)-modified 4-Acetamidophenol

| | MPC | 4Acetamido phenol-Br (B) | BPy | CuBr |
|---|---|---|---|---|
| Molar Ratio | 13 | 1 | 1.447 | 2.7 |
| No of mols | $2.17 \times 10^{-2}$ | $1.67 \times 10^{-3}$ | $3.14 \times 10^{-3}$ | $8.02 \times 10^{-4}$ |
| Calculated weight | 6.45 gg | 0.5 g | 0.49 g | 0.115 g |

TABLE 2-continued

Reactant Amounts for Preparation of Poly(MPC)-modified 4-Acetamidophenol

| MPC | 4Acetamido phenol-Br (B) | BPy | CuBr |
|---|---|---|---|

The reaction yielded greater than 50% of a crystalline fluffy white solid. Upon polymerisation, the paracetamol is identifiable in the $^1$H NMR spectrum as a series of peaks between δ 6.9 and 8.8 ppm, alongside the expected poly (MPC) peaks. The ratio of MPC:initiator was as expected and aqueous GPC gave a polydispersity of 1.07.

EXAMPLE 7

Preparation of Poly(MPC)-modified Salicylic Acid

The method for the preparation of Poly(MPC)-modified salicylic acid was exactly that as described in Example 4 using (A) (synthesised in Example 3) as the initiator and the following quantities of reactants:

TABLE 3

Reaction Amounts For Preparation of Poly (MPC)-modified Salicylic Acid (1:64)

| | MPC | Salicylic Acid-Br | BPy | CuBr |
|---|---|---|---|---|
| Molar Ratio | 64 | 1 | 1.447 | 3.33 |
| No of mols | $3.36 \times 10^{-2}$ | $5.23 \times 10^{-4}$ | $9.74 \times 10^{-2}$ | $2.02 \times 10^{-4}$ |
| Calculated weight | 10 g | 0.15 g | 0.152 g | 0.029 g |

The product was isolated as a white fluffy crystalline solid. NMR confirmed 100% conversion and the correct monomer: initiator ratio. Aqueous GPC was used to measure polydispersity which was 1.09.

EXAMPLE 8

Preparation of Poly(MPC)-modified Dexamethasone

The method for the preparation of Poly(MPC)-modified dexamethasone was exactly that as described in Example 5 using (C) (synthesised as in Example 4) as the initiator and the following quantities of reactants:

TABLE 4

Reactant Amounts for Preparation of Poly(MPC)-modified Dexamethasone

|  | MPC | Dexamethasone-Br (C) | BPy | CuBr |
|---|---|---|---|---|
| Molar Ratio | 10 | 1 | 2 | 1.44 |
| No of mols | $1.85 \times 10^{-2}$ | $1.85 \times 10^{-3}$ | $3.69 \times 10^{-3}$ | $1.28 \times 10^{-3}$ |
| Calculated weight | 5.49 g | 1 g | 0.58 g | 0.185 g |

The reaction yielded greater than 50% of a pale yellow solid. $^1$H NMR confirmed the expected ratio of monomer:initiator and GPC gave a polydispersity of 1.08.

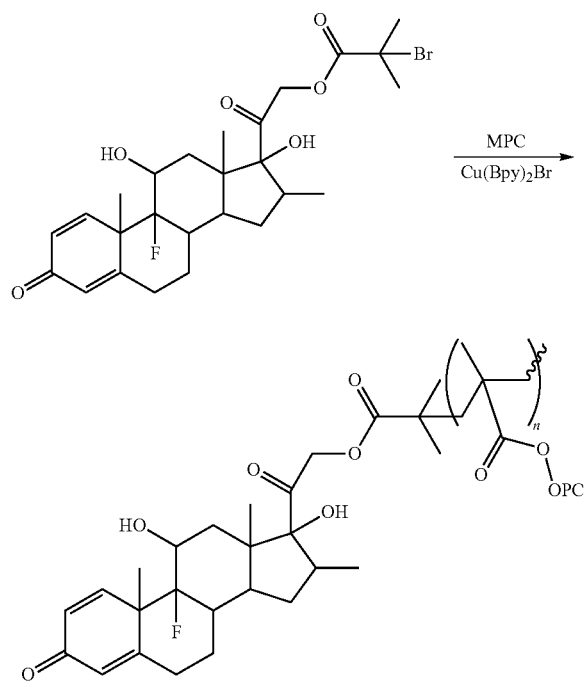

EXAMPLE 9

Effect of Polymer Modification on Drug Solubility

TABLE 5 shows the effect of the MPC polymer modification on the solubility of the drug compounds:

| Drug | Solubility of Drug (g/ml) | Solubility of Drug (mol/ml) | Solubility of Polymer-Drug (g/ml) | Solubility of Polymer-Drug (mol drug/ml) |
|---|---|---|---|---|
| Salicylic Acid (13:1) | $2.2 \times 10^{-3}$ | $1.6 \times 10^{-5}$ | >1.03 | $>3.3 \times 10^{-4}$ |
| Salicylic Acid (64:1) | $2.2 \times 10^{-3}$ | $1.6 \times 10^{-5}$ | >0.92 | $>6.4 \times 10^{-5}$ |
| Acetamidophen | $6.7 \times 10^{-3}$ | $4.4 \times 10^{-5}$ | >0.64 | $>2.1 \times 10^{-4}$ |

The polymer-modified compound was added step-wise to water to determine the maximum solubility at room temperature. An upper limiting solubility was not determined, as the viscosity for the solution increased dramatically due to the presence of the polymer making it difficult to assess when no more compound would dissolve. The figures quoted simply demonstrated that the water solubility of the drug has been increased on a mole-for-mole basis given the increase in molecular weight due to the attachment of the MPC polymer.

EXAMPLE 10.1

Preparation of 4-(3-(2-bromo,2-methyl-propionate) phenyl)-propionic acid N-hydroxysuccinimide ester (Prospective)

To a solution of 4-(3-hydroxyphenyl)-propionic acid (a) in acetonitrile, TMEDA (0.55 equiv) is added and stirred at room temperature for about 5 min. A solution of 2-bromo,2-methyl propionic acid bromide (b) (1.5 equivalent) in acetonitrile is slowly added. After about 15 min of addition a white precipitate should be observed in the reaction vessel. After addition of the acid bromide (about 30 min), the reaction is stirred for about a further 60 min. The reaction mixture is filtered and the solvent removed in vacuo to yield 4-(3-(2-bromo,2-methyl-propionic ester)phenyl)-propionic acid (c).

To a solution of 4-(3-(2-bromo,2-methyl-propionate)phenyl)-propionic acid (1 equivalent) in THF, N-hydroxy succinimide (1.05 equivalents) and dicyclohexylcarbodiimide (d) (1.05 equivalents) is added at −18° C. and stirred for about 2 h. The reaction is allowed to warm to room temperature and stirred for a further 10 h. The reaction is worked up as described by Rutinger & Ruegg in Biochem J., 133(3), 538, 1973 to yield 4-(3-(2-bromo, 2-methyl-propionate)phenyl)-propionic acid N-hydroxysuccinimide ester (e).

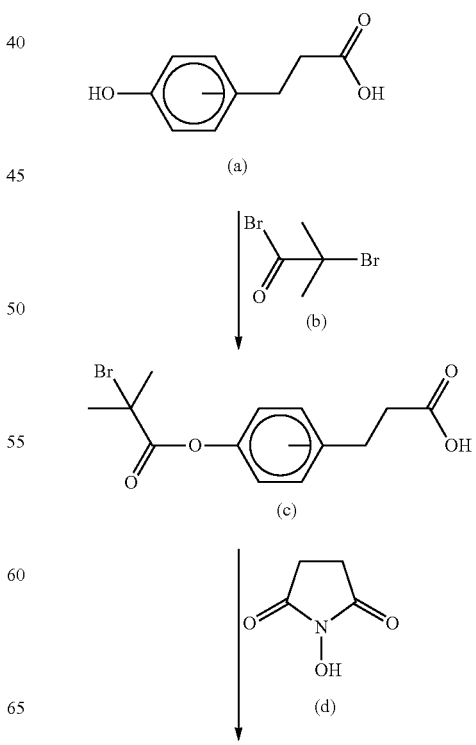

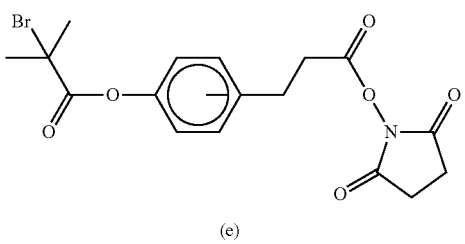

(e)

Example 10.1-Preparation of 2-bromo,2-methyl-propionic acid N-hydroxysuccinimide ester

EXAMPLE 10.2

Lysozyme Conjugation to ATRP Initiator

To a suspension of 4-(3-(2-bromo,2-methyl-propionate) phenyl)-propionic acid N-hydroxysuccinimide (e) ester in borate buffer, lysozyme is added and the resulting mixture gently shaken at room temperature for about 8 h. The initiator (f) is used without isolation.

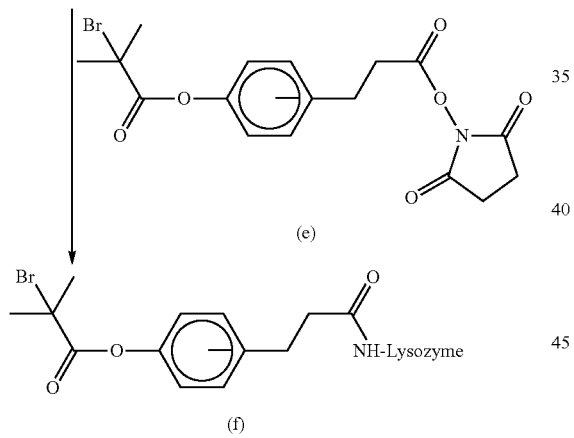

Example 10.2-conjugation of initiator to lysozyme.

EXAMPLE 10.3

ATRP Using the Conjugated Initiator

The initiator solution is purged with nitrogen for about 30 min, and then copper bromide catalyst and the bipyridyl ligand added. The solution is further purged with nitrogen, and MPC added (50× catalyst concentration, target Mn 15 000). The green reaction mixture is stirred for about 8 h at room temperature. The reaction is monitored by NMR aliquots, for consumption of the MPC methacrylate groups. The reaction mixture is analysed and product (g) purified by Capillary Electrophoresis.

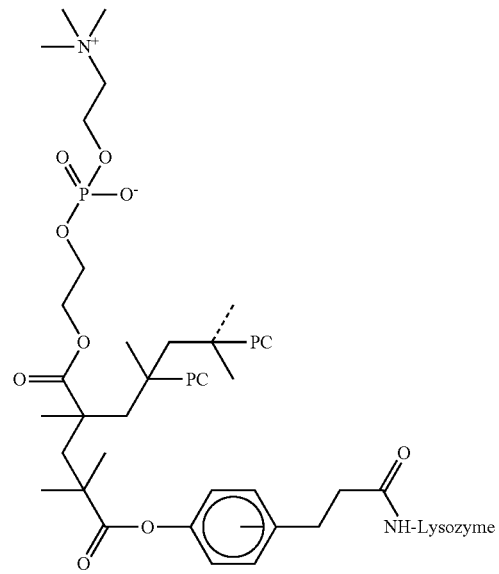

(g)

Example 10.3-ATRP using the lysozyme conjugated initiator.

The invention claimed is:

1. A compound comprising a conjugate of a biologically active moiety and a polymeric group having a general formula:

VIII in which $M^1$ is the divalent group formed when the compound of the general formula I is polymerized $$YBX \qquad I$$

in which Y is an ethylenically unsaturated group selected from $H_2C{=}CR{-}CO{-}A{-}$, $H_2C{=}CR{-}C_6H_4{-}A^1{-}$, $H_2C{=}CR{-}CH_2A^2$, $R^2O{-}CO{-}CR{=}CR{-}CO{-}O$, $RCH{=}CH{-}CO{-}O{-}$, $RCH{=}C(COOR^2)CH_2{-}CO{-}O$,

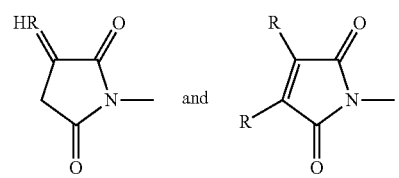

A is —O— or $NR^1$;
$A^1$ is selected from the group consisting of a bond, $(CH_2)_nA^2$ and $(CH_2)_n SO_3$— in which n is 1 to 12;
$A^2$ is selected from the group consisting of a bond, —O—, O—CO—, CO—O, CO—$NR^1$—, —$NR^1$—CO, O—CO—$NR^1$—, $NR^1$—CO—O—;
R is hydrogen or $C_{1-4}$ alkyl;
$R^1$ is selected from the groups consisting of hydrogen, $C_{1-4}$ alkyl or BX:
$R^2$ is hydrogen or $C_{1-4}$ alkyl;
B is selected from the group consisting of a bond, or a straight and branched alkanediyl, alkylene oxaalkylene, and alkylene (oligooxalkylene) groups, optionally containing one or more fluorine substituents; and X is a zwitterionic group, $M^2$ is the divalent group formed when an ethyleneically unsaturated comonomer selected from anionic, cationic and non-ionic monomers is polymerised, and $I^1$ is the residue of a initiator of general formula V which comprises said biologically active moiety,

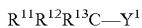     V where:

$Y^1$ is selected from the group consisting of Cl, Br, I, $OR^{10}$, $SR^{14}$, $SeR^{14}$, $OP(=O)R^{14}$, $OP(=O)(OR^{14})_2$, $O-N(R^{14})_2$ and $S-C(=S)N(R^{14})_2$, where $R^{10}$ is alkyl of from 1 to 20 carbon atoms in which each of the hydrogen atoms may be independently replaced by halide, $R^{14}$ is aryl or a straight or branched $C_1$-$C_{20}$ alkyl group, and where an $N(R^{14})_2$ group is present, the two $R^{14}$ groups may be joined to form a 5- or 6-membered heterocyclic ring;

$R^{11}$ and $R^{12}$ are each independently selected from the group consisting of H, halogen, $C_1$-$C_{20}$ alkyl, $C_3$-$C_8$ cycloalkyl, $C(=O)R^{15}$, $C(=O)NR^{16}R^{17}$, COCl, OH, CN, $C_2$-$C_{20}$ alkenyl, oxiranyl, glycidyl, aryl, heterocyclyl, aralkyl and aralkenyl, in any of which the alkyl, alkenyl or aryl, heterocyclyl or cycloalkyl groups there may be from 1 to 3 substituents selected from the group consisting of hydrogen, hydroxy $C_1$-$C_4$ alkoxy, acyloxy, aryl, heterocyclyl, $C(=O)R^{15}$, $C(=O)NR^{16}R^{17}$, $-CR^{12}R^{13}Y^1$, $CR^{11}R^{12}Y^1$, oxiranyl and glycidyl;

where $R^{15}$ is selected from the group consisting of alkyl of from 1 to 20 carbon atoms, alkoxy of from 1 to 20 carbon atoms, oligo(alkoxy) in which each alkoxy group has 1 to 3 carbon atoms, aryloxy and heterocyclyloxy groups any of which groups may have substituents selected from the group consisting of optionally substituted alkoxy, oligoalkoxy, amino (including mono-- and di-alkyl amino and trialkyl ammonium, which alkyl groups, in turn may have substituents selected from acyl, acyloxy, alkoxy, alkoxycarbonyl, alkenoxycarbonyl, aryl and hydroxy), and hydroxyl groups;

$R^{16}$ and $R^{17}$ are independently selected from the group consisting of H and alkyl of from 1 to 20 carbon atoms which alkyl groups, in turn may have substituents selected from the group consisting of alkoxy, acyl, acyloxy, alkoxycarbonyl, alkenoxycarbonyl, aryl and hydroxy, or $R^{16}$ and $R^{17}$ may be joined together to form an alkanediyl group of from 2 to 5 carbon atoms, thus forming a 3- to 6-membered ring; and $R^{13}$ is selected from the group consisting of biologically active group-substituted alkyl, cycloalkyl, $-COR^{15}$, $-CONR^{16}R^{17}$, alkenyl, aryl, heterocyclyl, aralkyl and aralkenyl groups, in any of which the alkyl, alkenyl, aryl, heterocyclyl or cycloalkyl groups may have from 1 to 3 substituents selected from the group consisting of hydrogen, hydroxy, $C_1$-$C_4$ alkoxy, acyloxy, aryl, heterocyclyl, $C(=O)R^{15}$, $C(=O)NR^{16}R^{17}$, $-CR^{12}R^{13}Y^1$, $CR^{11}R^{12}Y^1$, oxiranyl and glycidyl where $R^{15}$, $R^{16}$ and $R^{17}$ are groups as defined above for $R^{11}$ and $R^{12}$ with the biologically active group substituted on an alkyl, cycloalkyl, alkenyl, aryl or heterocyclyl group;

and $R^{36}$ is a monofunctional group or atom which terminates the polymeric group $M^1_n$, n is at least 2 and m is at least 0.

2. A compound according to claim 1 in which $I^1$ is $-CR^{11}R^{12}R^{13}$ in which $R^{11}$ to $R^{13}$ are as defined in claim 1.

3. A compound according to claim 1 in which $I^1$ is a group

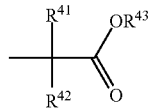

in which $R^{41}$ and $R^{42}$ are independently selected from hydrogen, straight, branched and cyclic alkyl, aryl, aralkyl, hydroxy-alkyl and acyloxyalkyl; and $OR^{43}$ is selected from the group consisting of an alkoxy of from 1 to 20 carbon atoms having a biological active substituent, an aryloxy that is biologically active and a heterocyclyloxy that is biologically active.

4. A compound according to claim 3 in which either
a) $R^{41}$ and $R^{42}$ are each methyl; or
b) $R^{41}$ is hydrogen and $R^{42}$ is methyl.

5. A compound according to claim 3 in which $R^{43}$ is $R^{44}AL$-derived from $R^{44}ALOH$ in which $R^{44}$ is derived from a pharmacologically or diagnostically active compound $R^{44}AH$ where A is a divalent moiety selected from the group consisting of O, $NR^{35}$ ($R^{35}$ is H or lower alkyl), COO and $CONR^{35}$, and L is a divalent linker.

6. A compound according to claim 5 in which L is an oligopeptide-based linker.

7. A compound according to claim 3 in which $R^{43}$ is derived from a pharmaceutically or diagnostically active alcohol $R^{43}OH$.

8. A compound according to claim 7 in which $R^{43}OH$ is a carbohydrate.

9. A compound according to claim 8 in which the carbohydrate is a saccharide.

10. A compound according to claim 1 in which the compound has a molecular weight in the range 1000 to 100,000.

11. A compound according to claim 1 in which the polymeric group has a polydispersity less than 1.5.

12. A compound according to claim 1 in which groups $M^1$ and $M^2$ are randomly arranged.

13. A compound according to claim 1 in which the polymeric group is a block polymeric group, in which one block comprises residues $M^1$ and another block comprises residues $M^2$, and in which either the $M^1$-containing block, or the $M^2$-containing block is attached to $I^1$.

14. A compound according to claim 1 which is soluble in water.

15. A compound according to claim 1 in which X is a group of the general formula II

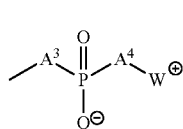     II in which the moieties $A^3$ and $A^4$, which are the same or different, are $-O-$, $-S-$, $-NH-$ or a valence bond and $W^+$ is a group comprising an ammonium, phosphonium or sulphonium cationic group and a group linking the anionic and cationic moieties which is a $C_{1-12}$-alkanediyl group.

16. A compound according to claim 15 in which $W^+$ is a group of formula

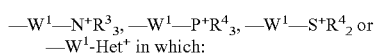

in which:

$W^1$ is selected from the group consisting of alkanediyl of 1 or more, preferably 2-6 carbon atoms optionally containing one or more ethylenically unsaturated double or triple bonds, disubstituted-aryl (arylene), alkylene arylene, arylene alkylene, alkylene aryl alkylene, cycloalkanediyl, alkylene cycloalkyl, cycloalkyl alkylene and alkylene cycloalkyl alkylene, which group $W^1$ optionally contains one or more fluorine substituents and/or one or more functional groups; and either the groups $R^3$ are the same or different and each is hydrogen or alkyl of 1 to 4 carbon atoms, preferably methyl, or aryl, such as phenyl, or two of the groups $R^3$ together with the nitrogen atom to which they are attached form an aliphatic heterocyclic ring containing from 5 to 7 atoms, or the three groups $R^3$ together with the nitrogen atom to which they are attached form a fused ring structure containing from 5 to 7 atoms in each ring, and optionally one or more of the groups $R^3$ is substituted by a hydrophilic functional group; and the groups $R^4$ are the same or different and each is $R^3$ or a group $OR^3$, where $R^3$ is as defined above; or Het is an aromatic nitrogen-, phosphorus- or sulphur- containing ring.

17. A compound according to claim 15 in which X is a group of general formula III

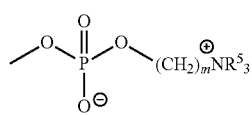

III where the groups $R^5$ are the same or different and each is hydrogen or $C_{1-4}$ alkyl, and m is from 1 to 4.

18. A compound according to claim 1 in which Y is $H_2C=CR-CO-A-$ in which R is hydrogen or methyl and A is O.

19. A compound according to claim 1 in which B is a straight chain $C_{2-6}$-alkanediyl.

20. A compound according to claim 1 in which the zwitterionic monomer is 2-methacryloyloxyethyl-2'-trimethylammonium ethyl phosphate inner salt.

21. A compound according to claim 1 in which the biologically active moiety is a steroid moiety.

22. A compound according to claim 21 in which the steroid is cholesterol.

23. A compound according to claim 1 in which the compound has a molecular weight in the range 2000 to 50000.

24. A compound according to claim 1 in which $M^2$ is a compound of the general formula:

X in which $R^{31}$ is selected from hydrogen, halogen, $C_{1-4}$ alkyl and groups $COOR^2$ in which $R^2$ is hydrogen and $C_{1-4}$ alkyl;

$R^{32}$ is selected from hydrogen, halogen and $C_{1-4}$ alkyl;

$R^{33}$ is selected from hydrogen, halogen, $C_{1-4}$ alkyl and groups $COOR^2$ provided that $R^{31}$ and $R^{33}$ are not both $COOR^2$; and $R^{34}$ is a $C_{1-10}$ alkyl, a $C_{1-20}$ alkoxycarbonyl, a mono-or di-($C_{1-20}$ alkyl) amino carbonyl, a $C_{6-20}$ aryl, a $C_{7-20}$ aralkyl, a $C_{6-20}$ aryloxycarbonyl, a $C_{1-20}$-aralkyloxycarbonyl, a $C_{6-20}$ arylamino carbonyl, a $C_{7-20}$ aralkylamino, a hydroxyl or a $C_{2-10}$ acyloxy group, any of which may have one or more substituents selected from halogen atoms, alkoxy, oligo-alkoxy, aryloxy, acyloxy, acylamino, amine, carboxyl, sulphonyl, phosphoryl, phosphino, zwitterionic, hydroxyl groups, vinyloxycarbonyl and other vinylic or allylic substituents, and reactive silyl or silyloxy groups;

or $R^{34}$ and $R^{33}$ or $R^{34}$ and $R^{32}$ may together form $-CONR^{35}CO$ in which $R^{35}$ is a $C_{1-20}$ alkyl group.

25. A compound according to claim 24 in which $M^2$ is an acrylic type compound, in which $R^{34}$ is an alkoxy carbonyl, alkyl amino carbonyl or aryl oxy carbonyl group.

26. A compound according to claim 25 in which $R^{34}$ is $C^{1-20}$ alkoxy carbonyl.

* * * * *